United States Patent [19]
Tripp

[11] 3,742,487
[45] June 26, 1973

[54] SCALE OF TWO IMPROVED DIGITAL AND ANALOG CONVERTER

[75] Inventor: Robert W. Tripp, Tuckahoe, N.Y.

[73] Assignee: Inductosyn Corporation, Valhalla, N.Y.

[22] Filed: Feb. 5, 1971

[21] Appl. No.: 112,994

[52] U.S. Cl.... 340/347 DA, 235/92 PS, 235/92 PL, 318/603, 318/608, 340/347 SY
[51] Int. Cl......................... H03k 13/02, H02p 11/00
[58] Field of Search............... 340/347 SY, 347 DA; 235/92 PL, 92 PS, 92 FQ; 318/603, 608

[56] References Cited
UNITED STATES PATENTS

| | | | |
|---|---|---|---|
| 3,258,667 | 6/1966 | McDonough et al. | 340/347 DA |
| 3,175,138 | 3/1965 | Kilroy et al. | 318/608 |
| 3,571,575 | 3/1971 | Barr et al. | 235/92 PL |

*Primary Examiner*—Maynard R. Wilbur
*Assistant Examiner*—Leo H. Boudreau
*Attorney*—William E. Beatty

[57] ABSTRACT

Disclosed is a digital and analog converter which is responsive to a digital value *n*, stored as a running count difference between the counts in two cyclically stepped counters, to form output signals which include analog components suitable as inputs for position-measuring devices such as Inductosyn transducers. The converter typically divides the transducer cycle into N parts where *n* is some value between O and N. A generation means, in accordance with the present invention, generates a change in the digital count difference *n* in response to digital input pulses. Unequal numbers of stepping pulses are supplied to the two counters where the difference in numbers is one for each digital input pulse, but where the total number of stepping pulses varies with different digital input pulses. The different number of total stepping pulses is cyclic and produces, in one embodiment, a 1-bit asymmetry with respect to a reference.

10 Claims, 6 Drawing Figures

INVENTOR.
ROBERT W. TRIPP

BY David E. Lovejoy
W. E. Beatty
ATTORNEYS

SCALE OF TWO IMPROVED DIGITAL AND ANALOG CONVERTER

CROSS REFERENCE TO RELATED APPLICATIONS

1. "Trigonometric Signal Generator and Machine Control," Ser. No. 864,079, Filed Oct. 6, 1969, invented by Robert W. Tripp, assigned to Inductosyn Corporation. 2. "High Speed Digital Tracking System," Ser. No. 112,993, Filed Feb. 5, 1971 which has matured into U. S. Pat. No. 3,673,395 issued June 27, 1972, invented by Robert W. Tripp, assigned to Inductosyn Corporation.

BACKGROUND OF THE INVENTION

The present invention relates to the field of digital and analog converters, and particularly to converters employed for accepting digital inputs and responsively providing signals, including at least an analog component, to position-measuring devices such as Inductosyn transducers.

One such prior art converter is described in the above-identified application Ser. No. 864,079. In that invention, a digital sine/cosine generator (DSCG) is described in which a clock signal is counted down through parallel first and second counters. A generation means is provided for accepting a digital input *n* and responsively generating a difference in count between the two counters equal to the digital input so as to relatively phase shift the outputs of the parallel first and second counters. The relatively phase-shifted outputs are logically combined to form one or more pulse-width modulated rectangular wave signals. In that converter, first and second counters have an effective count range of N so that for a digital input *n*, each of the pulse-width modulated output signals includes a fundamental frequency component having an amplitude proportional to a trigonometric function of an angle $\theta$, where $\theta$ equals $(n/N)360°$.

In one embodiment of that prior art invention, identified as the symmetrical embodiment therein, the generation means is effective to employ the digital input to establish a digital count difference between the first and second effective counters in a manner which is symmetrical with respect to a count in a reference counter. By way of explanation of that prior art invention, reference is made to FIG. 2, wherein lines A, B, C and D depict the pulse-width modulated output waveforms as they appear for 1-bit, 2-bit, 3-bit and 4-bit digital values of *n*, respectively. Referring to waveforms A and B, the portion added to waveform B over the previous pulse-width of waveform A is shown cross-hatched. Similarly, the additions from B to C and C to D are shown cross-hatched. It should be noted that all of the waveforms A through D are symmetrical about the reference point R. As indicated by the cross-hatching, each 1-bit change in pulse width causes the waveform to be symmetrically extended on both sides of the reference point R. The reference point R in FIG. 2 represents a timing point established by a reference counter having a count range N. The symmetrical shifting of the output waveforms, as represented in FIG. 2, is implemented in the referenced prior art invention for a 1-bit digital input by inhibiting for 1 bit one counter of first and second counters having count ranges N while advancing the other counter 2 bits at a time when the reference counter advances 1 bit. The symmetry thereby produced is desirable, when the converter is employed with an Inductosyn transducer, since it enables the error signal output from the Inductosyn transducer to be readily phase-detected.

The above-referenced prior art converter is typically employed to divide the periodic cycle of an Inductosyn transducer into N parts. For example, for a typical Inductosyn transducer cycle of 0.2 inch, and for first and second effective counters of count range equal to $2 \times 10^3$, the 0.2 inch cycle is divided into $2 \times 10^3$ parts, that is, each digital bit of the count range represents $10^{-4}$ inch. When a clock signal of $4 \times 10^6$Hz is employed in that system, the fundamental frequency of the pulse-width modulated signals derived from the first and second counters is $2 \times 10^3$Hz.

Because Inductosyn transducers and digital sine/cosine generators are typically employed together in a closed-loop servo system, the fundamental frequency of the pulse-width modulated signals is an important parameter for establishing the response time of the servo system. In general, it is desirable to have the fundamental frequency as high as practicable so as to insure that the response time is fast. Also, it is desirable, in instances where the higher accuracy is wanted, to have a higher number of divisions of the Inductosyn transducer cycle. For the generator of the above-referenced system, under the condition that a fixed clock frequency is established, an increase in the number of divisions of the Industosyn transducer cycle is accomplished by decreasing the fundamental frequency of the pulse-width modulated signals, or, alternatively, an increase in the fundamental frequency is accomplished by reducing the number of divisions of the Inductosyn transducer cycle.

While an increase in the number of divisions or an increase in the fundamental frequency may be achieved simultaneously by increasing the clock frequency, the practical limitations on the switching speeds for electronic circuits places an upper limit upon increases in the clock frequency.

It is desirable, in accordance with the above explanation to provide apparatus which allows an increase in the fundamental frequency and/or an increase in the number of divisions of the Inductosyn cycle without necessarily increasing the system's clock frequency. The general object, therefore, of the present invention is to provide such an improved generator exhibiting a higher fundamental frequency or a higher number of divisions for any given clock frequency.

SUMMARY OF THE INVENTION

The present invention is a digital to analog converter which is responsive to a digital value *n*, stored as a running count difference between the counts in two cyclically stepped counters, to form output signals which include analog components suitable as inputs for position-measuring devices such as Inductosyn transducers. The converter typically divides the transducer cycle into N parts where *n* is some value between O and N. A generation means, in accordance with the present invention, generates a change in the digital count difference between the counts in the two counters in response to digital input pulses. Unequal numbers of stepping pulses are supplied to the two counters where the difference in numbers is one for each digital input pulse, but where the total number of stepping pulses varies with different input pulses. The different number of total stepping pulses is cyclic and produces, in one embodiment, a one-bit asymmetry with respect to a reference.

The one-bit asymmetry of the present invention is explained with reference to the waveforms of FIG. 3 as compared with the prior art waveforms of FIG. 2. Waveforms E, F, G and H of FIG. 3 represent 1-, 2-, 3- and 4-bit digital values of $n$, respectively. The 1-bit extension of the pulse width, for example in waveform F compared with the previous pulse width of waveform E, is shown by cross-hatching. Note, in waveform F, the 1-bit extension to 2 bits from the 1-bit pulse width of waveform E appears to the left of the reference line R. The 1-bit extension from 2 bits in waveform F to 3 bits in waveform G is on the right-hand side of the reference. Similarly, the 1-bit extension in the pulse width going from the 3 bits of waveform G to the 4 bits of waveform H is again on the left-hand side. The alternate left-to-right, right-to-left placement of the the additional width, with respect to the reference, insures that the pulse is substantially symmetrical with respect to the reference, there being only a 1-bit asymmetry in the worst case.

The first and second counters and the reference counter of the present invention have an effective count range of N/2 and are each stepped 1 bit at a time by stepping pulses derived from a clock of frequency NF/2. The outputs from the first and second counters are logically combined to form one or more pulse-width modulated signals suitable for use as inputs to position-measuring devices. Each of the pulse-width modulated output signals includes a fundamental component of frequency F having an amplitude proportional to a trigonometric function of an angle $\theta$ where $\theta$ equals $(n/\text{N})360°$.

The generation means, which employs the 1-bit asymmetry in establishing a digital count difference, enables a factor of two increase in the number of divisions N of the transducer cycle, or alternatively, a factor of two increase in the fundamental frequency, F, all without necessitating an increase in the system's clock frequency K. The factor of two increase results because the first and second effective counters, asymmetrically stepped, require only a range of N/2 whereas the prior art requires a range of N.

In order to asymmetrically change the digital value $n$ by 1 bit, an alternating means (e.g., a flip-flop) is employed to reverse the number of counts employed to step the first and second counters for each digital input pulse. For a first digital input pulse employed to change $n$ by 1 bit, the first of the two counters is stepped 1 bit while the second is stepped 2 bits, at the same time that the reference counter is stepped 1 bit. On the next 1-bit change in the digital input $n$ resulting from one digital input pulse, the first counter is inhibited 1 bit while the reference counter is incremented 1 bit. In a similar manner, the third 1-bit change in the digital input $n$ again causes the first counter to be stepped 1 bit and the second counter to be stepped 2 bits while the reference counter is stepped 1 bit. In a similar manner, fourth and additional 1-bit changes in the digital input are implemented with alternate 0 and 1 mode and 1 and 2 mode steppings of the first and second counters while the reference counter is always stepped one bit as described.

When a change of direction of the changes in $n$ are desired (i.e., change from adding to $n$ to subtracting from $n$, or vice versa), then the 0 and 1 mode and 1 and 2 mode are reversed to a 1 and 0 mode and a 2 and 1 mode.

DETAILED DESCRIPTION

Figure 1:
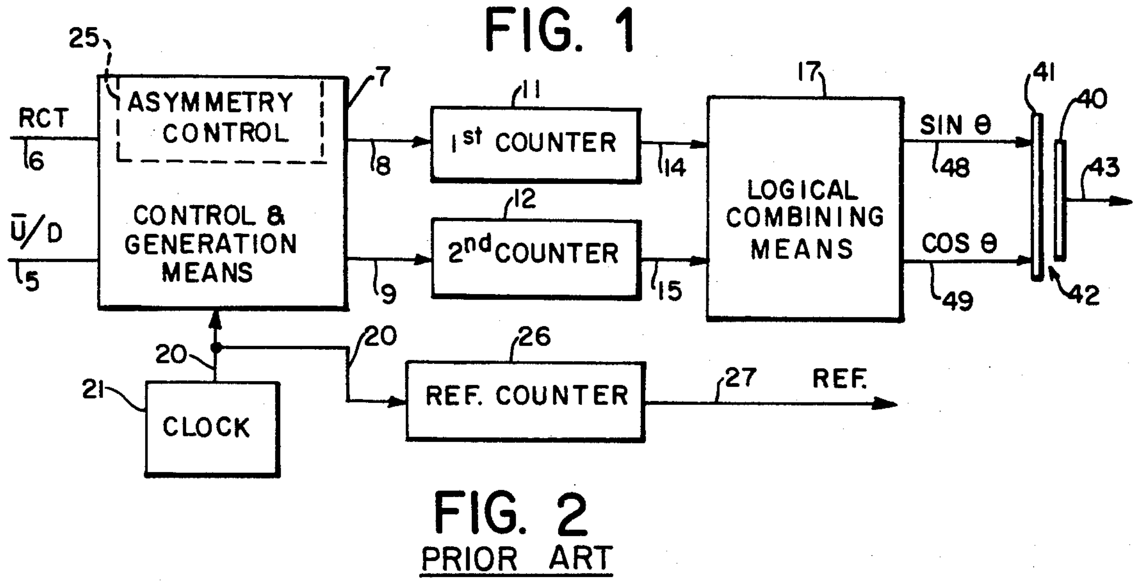
FIG. 1 depicts a general block diagram of the digital and analog converter of the present invention.
Figure 2:
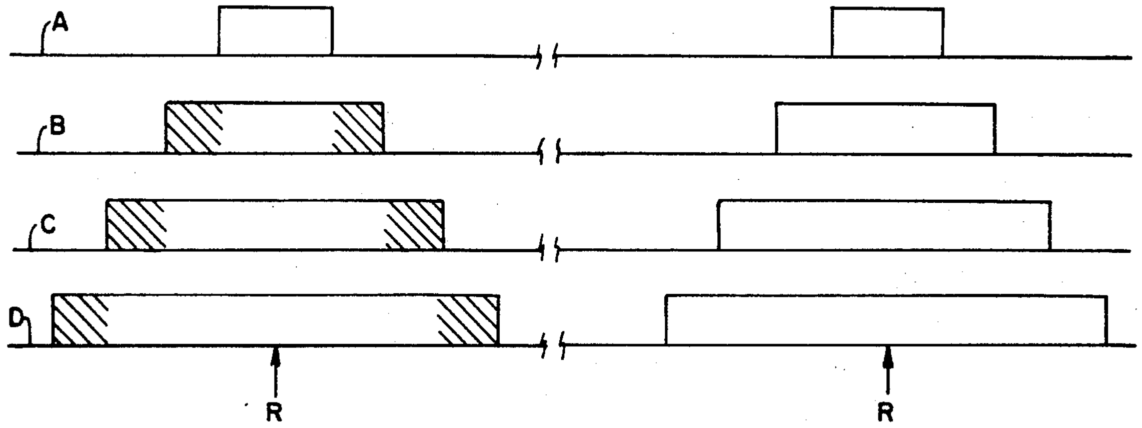
FIG. 2 PRIOR ART
FIG. 2 depicts waveforms descriptive of the operation of prior art digital converters.
Figure 3:
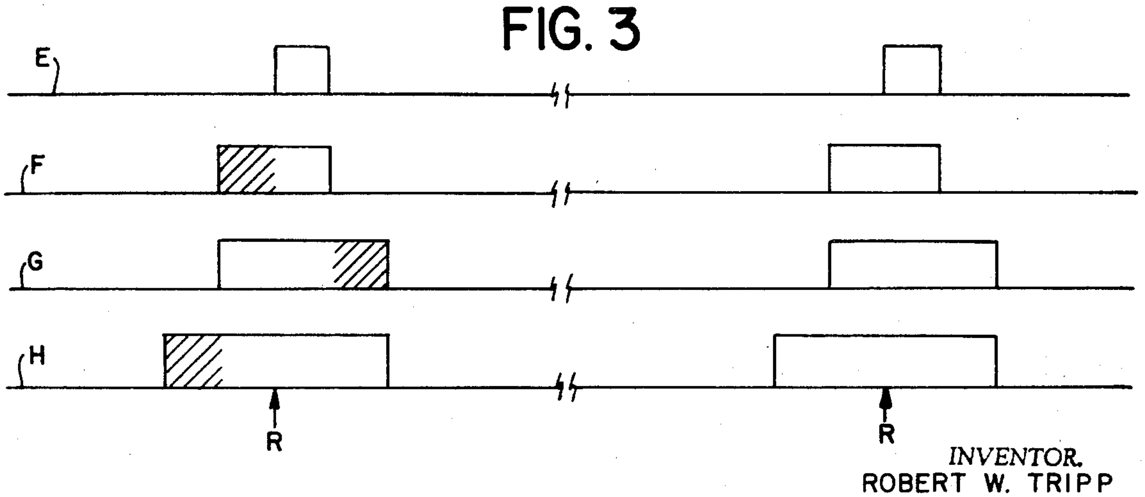
FIG. 3 depicts waveforms descriptive of the operation of the present invention positioned for ready comparison with the prior art waveforms of FIG. 2.

FIG. 1 depicts a digital sine/cosine generator in which digital inputs on lines 5 and 6 are accumulated in means 7 and converted to pulse-width modulated signals on lines 48 and 49 to provide inputs for a position-measuring device such as Inductosyn transducer 42. The FIG. 1 system, differs from prior art systems, basically in the structure and operation of the control and generation means 7. Control and generation means 7 includes asymmetry control 25, which causes the FIG. 1 apparatus to operate in accordance with the 1-bit asymmetry of the FIG. 3 waveforms, as distinguished from the exact asymmetry of the prior art represented by the waveforms of FIG. 2.

Briefly, with respect to FIG. 1, the digital input on line 6 is in the form of a serial train of pulses where the accumulated number $n$ of pulses represents the digital magnitude. The 1 or 0 level of the binary direction signal ($\overline{\text{U}}$/D) on line 5 determines the sign of the digital input, represented by the pulses on line 6, and whether each pulse adds to or subtracts from the accumulated number $n$. The control and generation means 7, besides receiving the digital input on lines 5 and 6, receives the clock signal on line 20 from clock 21. The output from generation means 7 appears on lines 8 and 9 connected to first counter 11 and second counter 12, respectively. The first and second counters 11 and 12 per se are each stepped through a count range N/4 by a signal derived from the clock signal on line 20 to produce square-wave pulses on lines 14 and 15 of fundamental frequency F.

Generation and control means 7 functions to establish a digital count difference between effective counters, including counters 11 and 12, equal to the algebraic sum $n$ of the number of input pulses on line 6. The difference in count between the effective counters 11 and 12 establishes a phase difference between the output square-wave pulses on lines 14 and 15. Logical combining means 17 receiving the counter outputs on lines 14 and 15 functions to combine the relatively phase-shifted signals on lines 14 and 15 to form pulse-width modulated signals on lines 48 and 49. The pulse widths of the signals on lines 48 and 49 are determined by the difference in count in the effective counters which is, in turn, determined by the digital input. More specifically, where the generation means 7, together with each of the counters 11 and 12, is effective to count through a count range of N/2 and where a digital value $n$ is derived from the input pulses received on line 6, the pulse trains on lines 48 and 49 are defined by pulse widths exhibiting fundamental frequency components having amplitudes proportional to a trigonometric function of the angle $\theta$ where $\theta$ equals $(n/N)360°$.

Where clock 21 has a frequency K of $10^7$Hz and where the Inductosyn transducer cycle is divided into $10^4$ divisions ($N=10^4$), the fundamental frequency on lines 48 and 49, in accordance with the present invention, is $2 \times 10^3$.

Figure 4A:
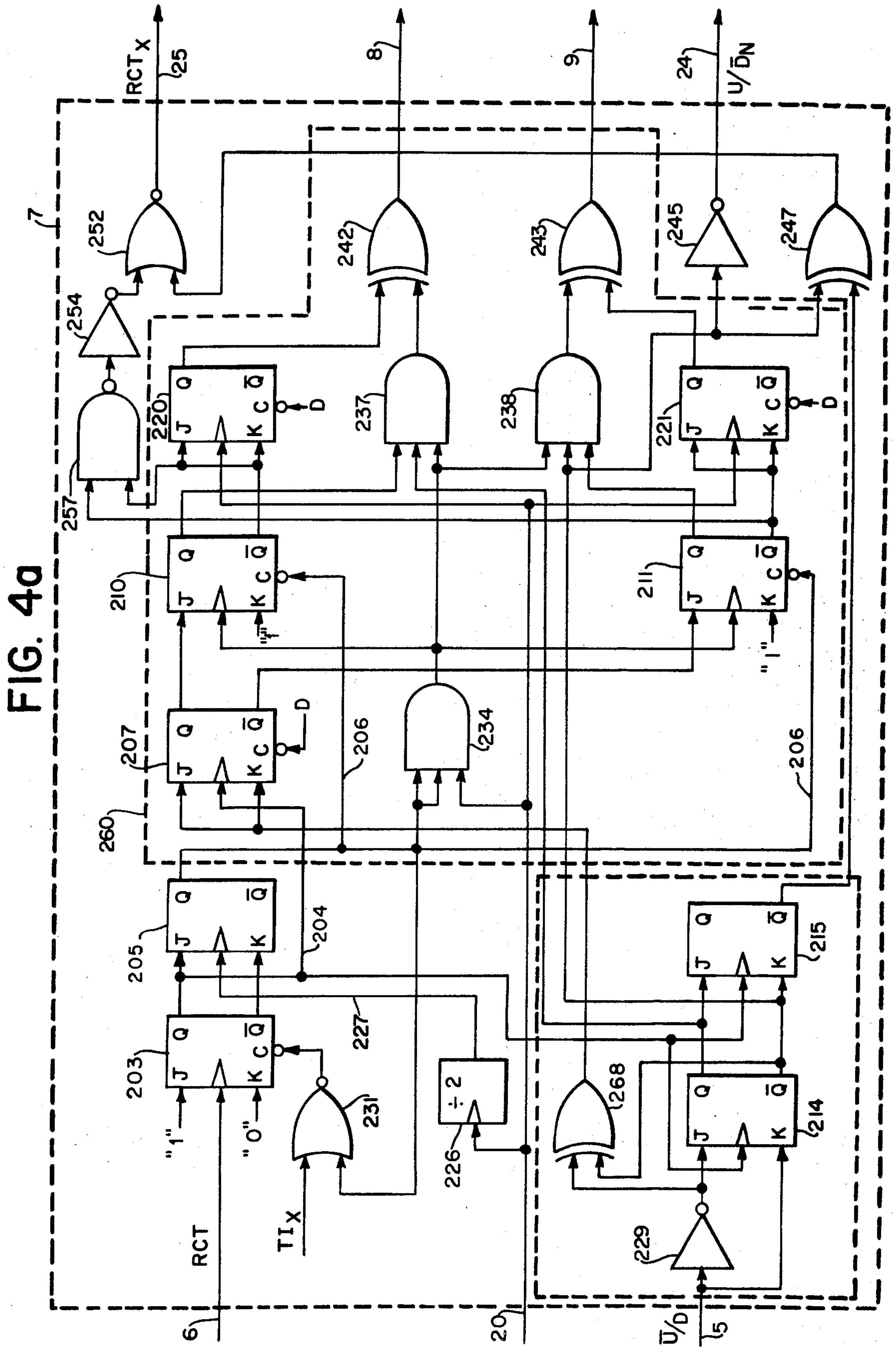
FIGS. 4*a* and 4*b* depict further details of the generator of FIG. 1
Figure 4B:
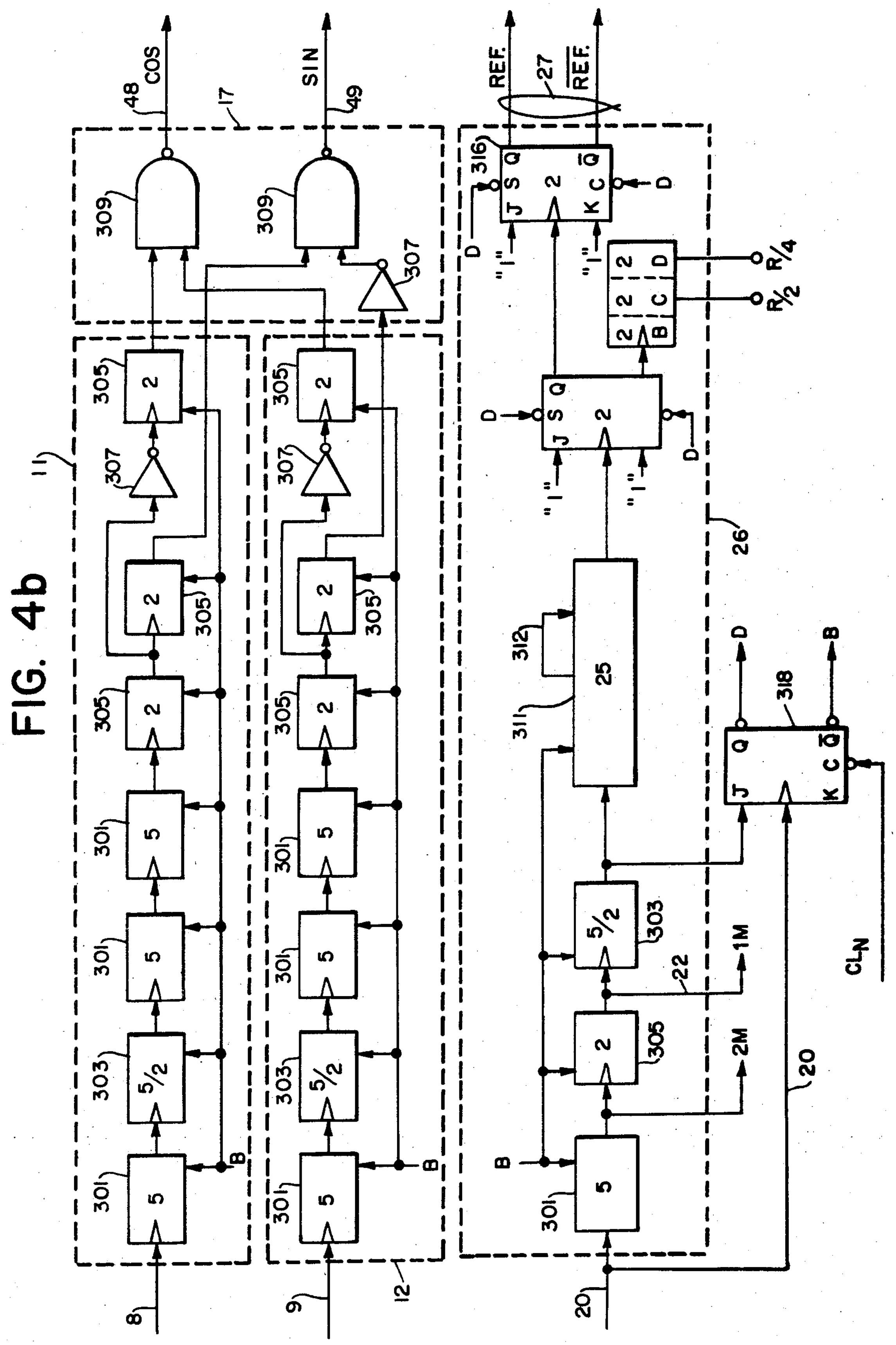

In FIG. 4*a*, the control and generation means 7, and in FIG. 4*b*, the first and second counters 11 and 12, the logical combining means 17, and the reference counter 26 correspond to the like-numbered devices of FIG. 1.

In FIG. 4*a*, the control and generation means 7 accepts the digital input in the form of input pulses on line 6 (labeled RCT). Line 6 is connected as the clock input to a JK flip-flop 203. Flip-flop 203 has its J and K inputs connected to 1 and 0 levels, respectively. The Q and $\overline{Q}$ outputs of flip-flop 203 are connected directly to the J and K inputs, respectively, of a second JK flip-flop 205. The clock input of flip-flop 205 is energized by negative-going pulses on line 227 which is derived from a count down of the clock signal on line 20 via a conventional divide-by-2 circuit 226. Flip-flops 203 and 205 serve as a shift register for time synchronizing each pulse input on line 6 to provide one synchronized pulse on lines 204 and 206 for each pulse on line 6. Line 206 is derived from the Q output of flip-flop 205 and is connected to the clear inputs of JK flip-flops 210 and 211, AND gate 234, and NOR gate 231.

Each pulse on line 206, also derived from a line 6 pulse, while at the 1 level, enables AND gate 234 and enables JK flip-flops 210 and 211 via their respective clear inputs C. Flip-flops 210 and 211 each have their K inputs tied to a 1 and have their J inputs connected to the Q and $\overline{Q}$ outputs of flip-flop 207, respectively. Flip-flops 210 and 211 are complementarily energized for each input pulse on line 6 as a function of the state of flip-flop 207.

Flip-flop 207 is normally clocked via line 204 for every second pulse on line 6 as it appears at the Q output of flip-flop 203. The JK inputs of flip-flop 207 are derived from an EXCLUSIVE-OR gate 268 in direction control means 262. EXCLUSIVE-OR gate 268 functions to detect changes in tbe direction signal ($\overline{U}$/D) appearing on line 5 and when such a change occurs, flip-flop 207 is inhibited from switching states in response to a pulse on line 6. Flip-flop 207 is, therefore, an alternating means which is switched, in the absence of a change in the direction signal on line 5, for each input pulse appearing on line 6 (as transmitted through flip-flop 203 and line 204 to the clock input of flip-flop 207).

The outputs of flip-flop 207 set either one or the other of complementary flip-flops 210 and 211 for every second input pulse on line 6 after it is transmitted to line 206.

Since flip-flop 207 alternates states, in the absence of a change in direction line 5, for every second pulse on line 6, flip-flops 210 and 211 responsively alternate states for every second input on line 6 in the absence of a change in direction line 5.

Flip-flops 210 and 211 are inhibit means responsive to the alternating means, constituted by flip-flop 207, for inhibiting one of the first or second dividers constituted by flip-flops 220 and 221.

The $\overline{Q}$ outputs for flip-flops 210 and 211 are connected to the J and K inputs of flip-flops 220 and 221, respectively. The clock inputs of flip-flops 220 and 221 are each connected to receive the clock signal on line 20. Flip-flops 220 and 221 are dividers which function to divide by 2 the clock signal on line 20 and produce on the respective Q outputs stepping pulses generally at half the frequency of the pulses on line 20. The Q outputs from flip-flops 220 and 221 serve as inputs to EXCLUSIVE-OR gates 242 and 243, respectively. EXCLUSIVE-OR gates 242 and 243 also receive inputs from bypass AND gates 237 and 238 to supply stepping pulses to lines 8 and 9, respectively. Lines 8 and 9 are connected as inputs to the first counter 11 and the second counter 12, respectively.

Under normal operation, in the absence of any pulses on line 6, flip-flops 220 and 221 are each operative to divide by 2 the number of pulses on line 20. Accordingly, equal numbers of output pulses appear on lines 8 and 9 and the first counter 11 and the second counter 12, shown in FIG. 4*b*, are each stepped in synchronism with an equal number of input counts. Whenever a pulse appears on line 6, either flip-flop 220 or flip-flop 221 is inhibited from switching thereby inhibiting or delaying one of the pulses on line 8 or line 9, respectively. Which of the lines 8 or 9 has the inhibited or delayed pulse is controlled by the flip-flop 207.

A further control on the pulses applied to lines 8 and 9 to the first and second counters results from the operation of the up/down signal on line 5. Line 5 has its 1 or 0 level applied to the K input of a JK flip-flop 214 and its inverted level via inverter 229 Q the J input of flip-flop 214. The 1 or 0 level of line 5 is stored in flip-flop 214 when a negative-going pulse is present on its clock input derived from the Q output of flip-flop 203. The flip-flop 214 has its Q and $\overline{Q}$ outputs connected directly to the J and K inputs, respectively, of a JK flip-flop 215. Flip-flops 214 and 215 serve as a shift register for storing the level of the signal on line 5. The clock input of flip-flop 215 is the same as the clock input for flip-flop 214 as derived from the - output of flip-flop 203. The Q and $\overline{Q}$ outputs of flip-flop 214 are connected to AND gates 237 and 238, respectively. AND gates 237 and 238 also receive inputs from the Q outputs of flip-flops 210 and 211, respectively. The third input to the AND gates 237 and 238 is derived from the AND gate 234. The outputs from AND gates 237 and 238 are connected as inputs to EXCLUSIVE-OR gates 242 and 243, respectively. The AND gates 237 and 238 function to bypass the flip-flops 220 and 221 delivering output pulses to lines 8 and 9 via EXCLUSIVE-OR gates 242 and 243. Since the divide-by-2 functions of the flip-flops 220 and 221 are bypassed when the AND gates 237 and 238 are energized, the weight of the pulses on lines 8 and 9 are double that of pulses transmitted via flip-flops 220 and 221. AND gate 237 is enabled only when flip-flop 220 is inhibited and, similarly, AND gate 238 is enabled only when flip-flop 221 is inhibited.

Referring to FIG. 4*b*, the stepping pulses on lines 8 and 9 from FIG. 4*a* are supplied in FIG. 4*b* to the first and second counters 11 and 12 per se, respectively. Counters 11 and 12 have a count range N/4 and are employed to register a digital count difference *n* in combination with flip-flop dividers 220 and 221 of FIG. 4*a* as further described hereinafter. In FIG. 4*b*, counters 11 and 12 are depicted as including conventional divide-by-5 stages 301, divide-by-2 stages 305 and stages 303 which may be selected to perform either a divide-by-5 or a divide-by-2. When stages 303 are selected to divide-by-5, then counters 11 and 12 have a count range equal to 2,500. Since counters 11 and 12 have a count range N/4, N equals $10^4$ for a count range of 2,500. If the divide-by-2 portion of stage 303 is selected, then counters 11 and 12 have a count range equal to 1,000, and N equals 4,000. If it is desired to have N equal 2,000, stages 303 may be eliminated completely.

In FIG. 4*b*, reference counter 26, showing one detailed embodiment of the like-numbered counter of FIG. 1, also includes a conventional divide-by-5 stage 301, a divide-by-2 stage 305 and a divide-by-5 or divide-by-2 stage 303. Stage 303 in reference counter 26 is connected or excluded in the same manner as the stages 303 in counters 11 and 12.

The output from stage 303 of counter 26 feeds a divide-by-25 stage 311 which includes conventional strapping, or other means, symbolically identified by line 312, which allows counter stage 311 to be preset with a special count when it receives a signal from input B described hereinafter. By presetting stage 311 and therefore reference counter 26, a predetermined phase of the outputs on lines 27 is established with respect to the outputs on lines 48 and 49. The output of stage 311 is connected through JK flip-flops 314 and 316, both of which function to divide by 2. When the divide-by-5 portion of stage 303 is selected, counter 26 has a count range of $5 \times 10^3$ which is equal to $N/2$ so that $N$ equals $10^4$. When the clock signal on line 20 has a frequency of $10^7$Hz and counters 11 and 12 have a count range $5 \times 10^3$ ($N = 10^4$), the output signal on lines 27 has a frequency of $2 \times 10^3$Hz. The significance of $N$ equalling $10^4$ is, of course, a division of the Inductosyn transducer cycle into $10^4$ divisions. For a different number of divisions of the Inductosyn transducer cycle, e.g. $N$ equals $2 \times 10^3$, the output frequency on lines 27 is increased to $10^4$Hz when a clock frequency of $10^7$Hz is applied on line 20. Establishing N at $2 \times 10^3$ is achieved, of course, by removing the stages 303 from counters 11, 12 and 26 previously described.

Flip-flop 318 in FIG. 4*b* provides a signal D on its Q output and a signal B on its $\overline{Q}$ output. The signals B and D are employed, in response to a clear signal $CL_N$, to reset various stages in counters 11, 12 and 26 of FIG. 4*b* and various flip-flops in the asymmetry control means 260 of FIG. 4*a*. Specifically, the signal D is connected to the clear inputs C of flip-flops 207, 220, 221, 314 and 316 as well as to the set inputs, S, of flip-flops 314 and 316. Similarly, the signal B is connected to the inputs of stages 301, 303, 305 and 311 in counters 11, 12 and 26. Referring to FIGS. 4*a* and 4*b*, flip-flop 220 divides by 2 the clock signals on line 20 and together with AND gate 237 provides, via EXCLUSIVE-OR gate 242, stepping pulses to the first counter 11 per se. Since counter 11 has a count range of $N/4$ and since flip-flop 220 has a count range of 2, flip-flop 220 and counter 11 together form a first effective counter having an effective count range of $N/2$.

In a similar manner, flip-flop 221 divides by 2 the clock pulses on line 20 and together with AND gate 238, via EXCLUSIVE-OR gate 243, provides stepping pulses to counter 12. Counter 12 and flip-flop 221 together form a second effective counter having a count range $N/2$.

Flip-flop 207 in FIG. 4*a* is an alternating means which functions to alternate the mode with which the first and second effective counters count. The mode is changed for each digital input pulse on line 6 in the absence of a change in the direction signal on line 5.

As described in further detail hereinafter, the first and second effective counters are alternately stepped with 1 and 0 counts, respectively, and with 2 and 1 counts, respectively, for alternate input pulses on line 6 when the direction signal on line 5 is at a first level. When the direction signal on line 5 is at a second level, the first and second effective counters are alternately stepped with 0 and 1 counts, respectively, and with 1 and 2 counts, respectively. For each of the above modes, the reference counter is uniformly stepped one count. Note that the difference in count, whether in the 1 and 0 or 0 and 1 mode or whether in the 2 and 1 or 1 and 2 mode, is one so that the difference in count between the effective counters is changed by one count for each digital input pulse.

OPERATION

Figure 5:
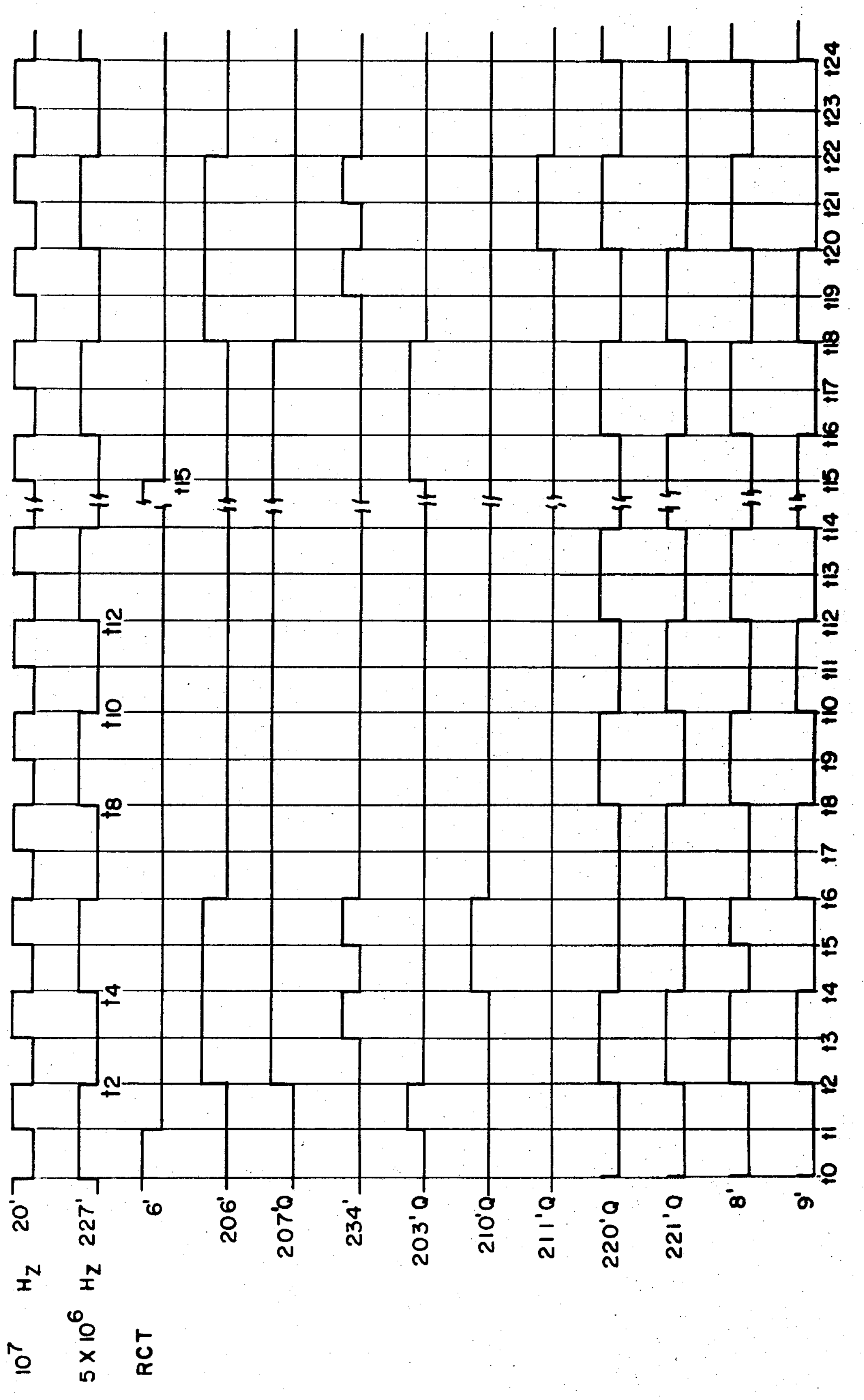
FIG. 5 depicts waveforms descriptive of the operation of the generator of FIGS. 4*a* and 4*b*.

The operation of the generator of FIGS. 4*a* and 4*b* is explained with reference to the waveforms of FIG. 5. In FIG. 5, the primed numbers identify waveforms which correspond with the signals at the unprimed number locations of FIGS. 4*a* and 4*b*. The basic timing is established by the clock signal on line 20 as represented by waveform 20'. The negative-going transitions of the clock signal on line 20 are identified in FIG. 5 by the times *t*0 through *t*24. In the example chosen for illustration, a break in time occurs in all of the waveforms between times *t*14 and *t*15 in order that two digital input pulses on line 6 of FIG. 4*a* may be represented, with a relatively long time interval therebetween, as indicated by waveform 6' in FIG. 5. The negative-going termination of the first digital input pulse occurs at *t*1, and the termination of the second digital input pulse occurs at *t*15 as shown by waveform 6'. It is assumed for purposes of illustration that the alternating flip-flop 207 is a 0 at *t*0. At time 0, flip-flop 203 is switched to a 1, as evidenced by the 1 on its output 203Q. The clock signal on line 20 is divided by 2 in divider 226 to form the timing signal on line 227, which strobes flip-flop 205 with its negative-going transition at time *t*2. At time *t*2, flip-flop 205 is switched to a 1, as appears in FIG. 5, for waveform 206' at time *t*2. With line 206 a 1, the AND gate 234 is switched to a 1 at *t*3, back to 0 at *t*4, to 1 at *t*5, and back to 0 at *t*6, as shown in waveform 234'. The negative-going transitions at *t*4 and *t*6 of the AND gate output 234' are operative to switch the 1 of the flip-flops 210 and 211 which is selected by the alternating flip-flop 207. Since it has been assumed for illustration purposes that flip-flop 207 is set to a 0, flip-flop 207 is switched to a 1 at *t*2 as evidenced by a 1 on its Q output. With flip-flop 207 a 1, flip-flop 210 is toggled by the signal of waveform 234' at *t*4 and again at *t*5 while the 0 on the $\overline{Q}$ output supplied as an input to flip-flop 211 prohibits any switching of flip-flop 211.

In the absence of any digital input pulse in waveform 6', the negative-going transitions of waveform 20' are operative to switch the waveforms 220'Q and 221'Q, as shown by the transitions at *t*0, *t*2 and *t*4. After a digital input pulse has a negative transition, as occurs at *t*1, the pulse between *t*4 and *t*6 of waveform 210'Q is formed in the manner explained above. Waveform 220'Q is inhibited from switching during the period from *t*4 to *t*6 while the waveform 210'Q is a 1. Waveform 220'Q again resumes switching at the next negative-going transition of the waveform 20' at t8.

The waveform 220'Q is inhibited from switching from t4 to t6 because flip-flop 210 is set to a 1 so that its output $\overline{Q}$ is set to a 1. The 0 on the 210$\overline{Q}$ output presents a 0 to the JK inputs of flip-flop 220, thereby preventing flip-flop 220 from switching. While flip-flop 210 is set to a 1, flip-flop 211 in FIG. 4 is set to a 0 so that its output 211$\overline{Q}$ is set to a 1. The 1 on that $\overline{Q}$ output is presented to the JK inputs of flip-flop 221, which allows flip-flop 221 to toggle at each negative-going transition of the clock signal on line 20.

In addition to flip-flops 220 and 221, AND gates 237 and 238 transmit stepping pulses to lines 8 and 9, respectively. AND gates 237 and 238 are operative to receive the clock pulse input from line 20 whenever a digital input pulse causes line 206 to be energized, which occurs between times *t*2 and *t*6 for waveform 206' in FIG. 5. One of the AND gates 237 and 238 is operative to pass the clock pulses received via AND gate 234 as a function of the direction signal on line 5, as stored in up/down flip-flop 214, and as a function of the alternating flip-flop 207 and the signals it stores in flip-flops 210 and 211. With flip-flop 207 storing a 1 between times *t*2 and *t*18 as indicated in waveform 207'Q, flip-flop 210 is also set to a 1 so that the 210Q output connected as an input to AND gate 237 is effective to enable AND gate 237. Under the assumed condition that the up/down direction signal on line 5 is a 0, converted to a 1 in inverter 229, the up/down flip-flop 214 is set to a 1 so that the U/D output at 214Q, serving as an input to AND gate 237, is also a 1. In summary, the 210Q and 214Q inputs to AND gate 237 enable AND gate 237 allowing its output and the output of EXCLUSIVE-OR gate 242 to be energized by the clock pulse appearing between *t*5 and *t*6, as shown by the 1 level of waveform 8' between *t*5 and *t*6. The effect of this operation is to provide on line 8 a negative-going transition at time *t*6, thereby providing an additional count to counter 11 over what would normally have been provided by the switching of flip-flop 220.

Because the up-down flip-flop 214 is set to 1, its $\overline{Q}$ output is a 0 which condition functions to inhibit the transfer of any pulses through AND gate 238 via EXCLUSIVE-OR gate 243 to line 9. Flip-flop 221, having its J and K inputs set at 1 by 211$\overline{Q}$, switches in the normal manner, thereby transmitting stepping pulses to line 9. Waveform 227' is conveniently compared with the waveforms 8' and 9', since waveform 227' is a divide-by-2 count down of the clock signal on line 20. Referring to the period just after time *t*2 until just after *t*14, three negative-going transitions occur in waveform 227'. Similarly, for the same period three negative-going transitions occur in waveform 9', since, for the particular mode illustrated, waveform 9' is also a straight divide-by-2 count down of waveform 20'. During the same period, however, waveform 8' exhibits four negative-going transitions as occur at *t*4, *t*6, *t*10 and *t*14.

For a second digital input pulse received immediately subsequent to the first digital input pulse terminating at *t*1, the waveforms of FIG. 5 are shown for times from before *t*15 until after *t*24. Note that a relatively long time may have transpired between times *t*14 and *t*15. The negative-going transition of the digital input pulse at *t*15 in waveform 6' causes line 206' to be positive between times *t*18 and *t*22. At the time *t*18 that waveform 206' goes positive, line 207'Q goes and remains negative. The 1 level of waveform 206' enables AND gate 234 allowing the clock pulses of waveform 20' between *t*19 and *t*20 and between *t*21 and *t*22 to be passed as shown in waveform 234'. Because AND gate 238 is inhibited by the 0 from the up/down flip-flop 214$\overline{Q}$ output, neither of the pulses between *t*19 and *t*22 of waveform 234' can be passed through gate 238 to line 9. Because alternating flip-flop 207 sets flip-flop 210 to a 0, the 210Q output thereof is a 0, which inhibits the energizing of AND gate 237 so that no pulses from AND gate 234 between times *t*19 and *t*22 are passed to line 8. With flip-flop 210 set to a 0, the JK inputs to flip-flop 220 are 1, thereby allowing flip-flop 220 to directly count down the clock signal on line 20 and provide pulses via EXCLUSIVE-OR gate 242 to line 8. With flip-flop 210 set to 0, flip-flop 211$\overline{Q}$ output presents a 0 to the JK input of flip-flop 221. Accordingly, flip-flop 221 is inhibited from changing until the signal on line 206 returns to 0 at *t*22. Again comparing waveforms 8' and 9' with waveform 227', it is apparent that waveform 8' is identical to waveform 227' and waveform 9' includes one less negative-going transition for the period from *t*16 to after *t*24.

A further understanding of the alternating action resulting from 1-bit count changes is observable in the following CHART I.

CHART I

| | U/D | RCT | RCT ÷2 | 1st Ct. | | 2nd Ct. | Ref. Ct. | Clock ÷2 |
|---|---|---|---|---|---|---|---|---|
| Time | 214' Q | (6') | 207' Q | 8' | "n" | 9' | 20' | 227' |
| t(−6) | 1 | | 0 | − (1) | 0 | − (1) | X (1) | X |
| t(−4) | 1 | | 0 | X (2) | 0 | X (2) | X (2) | − |
| t(−2) | 1 | | 0 | − (3) | 0 | − (3) | X (3) | X |
| t0 | 1 | | 0 | X (4) | 0 | X (4) | X (4) | − |
| t2 | 1 | X | 1 | − (5) | 0 | − (5) | X (5) | X |
| t4 | 1 | | 1 | X (6) | 0 | X (6) | X (6) | − |
| t6 | 1 | | 1 | X (8) | 1 | − (7) | X (7) | X |
| t8 | 1 | | 1 | − (9) | 1 | X (8) | X (8) | − |
| t10 | 1 | | 1 | X (10) | 1 | − (9) | X (9) | X |
| t12 | 1 | | 1 | − (11) | 1 | X (10) | X (10) | − |
| t14 | 1 | | 1 | X (12) | 1 | − (11) | X (11) | X |
| | | | | [+100] | | [+100] | [+100] | |
| t16 | 1 | X | 1 | − (113) | 1 | X (112) | X (112) | − |
| t18 | 1 | | 0 | X (114) | 1 | − (113) | X (113) | X |
| t20 | 1 | | 0 | − (115) | 1 | X (114) | X (114) | − |
| t22 | 1 | | 0 | X (116) | 2 | − (114) | X (115) | X |
| t24 | 1 | | 0 | − (117) | 2 | − (115) | X (116) | − |
| t26 | 1 | | 0 | X (118) | 2 | X (116) | X (117) | X |
| t28 | 1 | | 0 | − (119) | 2 | − (117) | X (118) | − |

Referring to CHART I, in combination with the waveforms of FIG. 5, digital inputs in the form of two RCT pulses occur on line 6 at times indicated as *t*2 and *t*16 but which as shown in FIG. 5 occur somewhat before those times. It has been assumed for purposes of explanation that the U/D signal represented by waveforms 214'Q remains fixed at the 1 level. Each negative-going pulse to the first counter 11 as represented by waveform 8' and each negative-going pulse to the second counter 12 as represented by waveform 9' is depicted in CHART I by X's. Similarly, the RCT digital input pulses, on line 6, the clock pulses on line 20 and the divided-by-2 clock pulses on line 227 are all represented by X's. The column labeled TIME corresponds in part with the times along the bottom of FIG. 5.

The arabic numbers in parentheses in the Ref. Ct. column of CHART I represent the total number of accumulated pulses received by the reference counter which equal the total number of negative-going transitions in waveform 20' of FIG. 5. The number in parentheses for the 1st Ct. and 2nd Ct. columns do not equal directly the number of counts in the first counter 11 and the second counter 12 of FIG. 4*b*. Rather, those numbers in parentheses for the 1st. Ct. column equal the total number of accumulated counts in the first effective counter, constituted by counter 11 of FIG. 4*b* and flip-flop 220 of FIG. 4*a*. Similarly, the numbers in parentheses for the 2nd Ct. column equal the total number of accumulated counts in the second effective counter constituted by the second counter 12 and flip-flop 221.

Note that between the times *t*14 and *t*16 it has been arbitrarily assumed for purposes of explanation that 100 additional pulses have occurred and have been accumulated in each of the first effective, second effective and reference counters.

At time *t*(−6) neither waveform 8' nor waveform 9' has a negative-going pulse, but flip-flops 220 and 221 are toggled so that the effective first and second counters each receive one input pulse as indicated by the 1's in parentheses in the 1st Ct. and 2nd Ct. columns. At time *t*(−4) flip-flops 220 and 221 are again toggled and are operative to produce negative-going signals on lines 8 and 9 providing stepping pulses to the first counter 11 and the second counter 12, respectively. The total accumulated counts in all counters is therefore 2 at time *t*(−4). The difference in count between the first and second effective counters starts at 0 as shown by the *n* column at *t*(−6). For each of the times *t*(−2), *t*0, *t*2 and *t*4, a 1 count increment in each of the effective counters occurs so that the value *n* remains at 0. Before time *t*2, a digital input pulse on line 6 is received and is effective at time *t*6 to again step the first counter 11 by a negative-going transition on line 8. Since the pulse on line 8 at time *t*6 immediately follows the pulse on line 8 at time *t*4, the pulse at time *t*6 effectively has a weight of 2 so that the accumulated count in the first effective counter jumps from 6 to 8 while the accumulated count in the second effective counter is stepped from 6 to 7. At time *t*6, therefore, the difference in count between the first and second effective counters is 1 reflecting as a count difference the one digital input pulses on line 6 as received before time *t*2. Just before time *t*16 after 100 additional stepping pulses have been recorded, a second digital input pulse on line 6 occurs. That second digital input pulse is reflected at time *t*22 in the second counter by the absence of a stepping pulse. Specifically, the accumulated count in the second counter at time *t*20 is 114 and at *t*22 the accumulated count is still 114 so that at time *t* 22 the difference in count between the first and second effective counters is increased from 1 to 2.

The alternate action of the present invention, in the absence of a change in the U/D signal as represented by waveform 214'Q, may be observed by referring to the operation after each of the digital input pulses,-nominally at times *t*2 and *t*16. The digital input pulse before time *t*2 causes a 2-bit jump in the first counter from 6 to 8 (see times *t*4 and *t*6) while the second counter and reference counter exhibit a 1 bit change during the same period.

By way of comparison, the 1-bit change resulting from the digital input pulse before *t*16 is reflected in the first and second effective counters by the first counter and reference counter taking a 1-bit step from times *t*20 to *t*22 while the second counter takes a 0-bit step (remaining at 114 without a change). This operation, as represented in CHART I, may be termed as a 2 and 1 mode alternating with a 1 and 0 mode for alternate digital input pulses under the condition that the direction signal (214'Q) does not change from a first level 1.

For an operation where the direction signal is at a second level (214'Q is a 0) and does not change, then the analogous alternating mode of action is 0 and 1 or 1 and 2 as determined by alternate digital input pulses.

Where there is a change in the direction signal, the alternating mode of action is inhibited as can be understood with reference to the following CHART II:

CHART II

| Time | U/D 214' Q | RCT (6') | RCT ÷2 207' Q | 1st Ct. 8' | "n" | 2nd Ct. 9' | Ref. Ct. 20' | Clock ÷2 227' |
|---|---|---|---|---|---|---|---|---|
| t(−2) | 1 | | 0 | − (1) | 0 | − (1) | X (1) | X |
| t0 | 1 | | 0 | X (2) | 0 | X (2) | X (2) | − |
| t2 | 1 | X | 1 | − (3) | 0 | − (3) | X (3) | X |
| t4 | 1 | | 1 | X (4) | 0 | X (4) | X (4) | − |
| t6 | 1 | | 1 | X (6) | 1 | − (5) | X (5) | X |
| t8 | 1 | | 1 | − (7) | 1 | X (6) | X (6) | − |
| t10 | 1 | | 1 | X (8) | 1 | − (7) | X (7) | X |
| t12 | 1 | | 1 | − (9) | 1 | X (8) | X (8) | − |
| t14 | 1 | | 1 | X (10) | 1 | − (9) | X (9) | X |
| t16 | 0 | X | 1 | − (11) | 1 | X (10) | X (10) | − |
| t18 | 0 | | 1 | X (12) | 1 | − (11) | X (11) | X |
| t20 | 0 | | 1 | − (12) | 0 | X (12) | X (12) | − |
| t22 | 0 | | 1 | − (13) | 0 | − (13) | X (13) | X |
| t24 | 1 | | 1 | X (14) | 0 | X (14) | X (14) | − |
| t26 | 1 | X | 1 | − (15) | 0 | − (15) | X (15) | X |
| t28 | 1 | | 1 | X (16) | 0 | X (16) | X (16) | − |
| t30 | 1 | | 1 | X (18) | 1 | − (17) | X (17) | X |
| t32 | 1 | | 1 | − (19) | 1 | X (18) | X (18) | − |
| t34 | 1 | | 1 | X (20) | 1 | − (19) | X (19) | X |
| t36 | 1 | | 1 | − (21) | 1 | X (20) | X (20) | − |

Referring to CHART II, three digital input pulses occur as shown at times *t*2, *t*16 and *t*26. At time *t*14, the direction signal is caused to change from the first to the second level and at time $t24$ changes back from the second level to the first level. The first digital input pulse at time $t2$ causes, as indicated at time $t6$, a 2 and 1 mode of operation since the first counter advances 2 bits from 4 to 6 while the second and reference counters advance from 4 to 5. Because of the change in the direction signal from times $t14$ to $t16$, the digital input pulse at time $t16$ causes a shift to the 0 and 1 mode of counting as indicated by the 0-bit step from time $t18$ to $t20$ of the first counter while the second and reference counters are taking a 1-bit step. The digital input pulse at time $t26$, after the direction signal change at $t24$, switches the mode again to 2 and 1 as reflected by the 2-bit change of the first counter from time $t28$ to $t30$ while the second and reference counters are changing 1 bit.

The manner of changing modes of counting after a change in the direction signal insures that the accumulated counts in the first and second effective counters straddles the accumulated count of the reference counter. In this manner, no more than a 1-bit asymmetry with respect to the reference count occurs as previously explained in connection with FIG. 3.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A digital converting apparatus for supplying two trigonometrically related analog signals comprising, a source of clock pulses, a first counter means and a second counter means for counting and registering stepping pulses, a first effective counter including said first counter means, a second effective counter including said second counter means, each of said effective counters having a count range $N/2$, wherein $N$ is an integer, each of said effective counters being operative to be stepped by stepping pulses derived from said clock pulse source, cyclically through a count range, a reference counter means for establishing a reference point, said reference counter means being operative to be stepped by stepping pulses derived from said clock pulse source, cyclically through a count range of $N/2$, a digital input in the form of input pulses, generation means, including asymmetry control means, said generation means supplying an equal number of stepping pulses to said first and second effective counters which are equal to the number of stepping pulses supplied to said reference counter means in the absence of said input pulses, said asymmetry control means for supplying an unequal number of stepping pulses to said first and second effective counters in the presence of said input pulse so as to maintain the count difference between said first and second effective counters substantially equally disposed about the count in said reference counter, means for logically combining count registering signals from both said first and second counter means to form two analog signals, each of which is substantially symmetrical about said reference point, said asymmetry control means changing each of said analog signals alternately in magnitude by equal amounts on opposite sides of said reference point in response to successive stepping pulses.

2. The apparatus of claim 1 further including a binary state directional store for storing a direction signal which indicates the positive or negative count direction for each of said input pulses and wherein said asymmetry control means includes alternating means, said alternating means being changed in state in the absence of a change in said direction signal, for each of said input pulses, means for detecting a change in state of said direction signal for two successive input pulses, said means for detecting being operative, when energized, to inhibit the change in state of said alternating means on the second of said two successive input pulses.

3. The apparatus of claim 2 wherein for said direction signal at a first state, said first and second effective counters are stepped with 0 and 1 pulse, respectively, by said asymmetry control means and with 1 and 2 pulses, respectively, by said asymmetry control means with alternate input pulses.

4. The apparatus of claim 3 wherein for said direction signal at a second state, said first and second effective counters are stepped with 1 and 0 pulse, respectively, and with 2 and 1 pulses, respectively, with alternate input pulses.

5. The apparatus of claim 4 wherein a change in state of said direction signal causes said counters when counting in the 0 and 1 mode or in the 1 and 0 mode to count for the next input pulse in the 2 and 1 or 1 and 2 mode, respectively, or when counting in the 1 and 2 or 2 and 1 mode to count for the next input pulse in the 1 and 0 or 0 and 1 mode, respectively.

6. A digital converting apparatus comprising, a source of clock pulses of frequency $NE/2$ wherein $N$ is an integer and $F$ is a fundamental frequency, first counter means and second counter means each operative to be stepped by stepping pulses cyclically through a count range $N/4$, a digital input including input pulses, generation means for generating a digital count representing a digital magnitude where $n$ is equal to the algebraically accumulated difference in count between the numbers of input pulses registered in said first and second counter means, said generation means including asymmetry control means having, first and second digital dividers connected in combination with said first and second counter means, respectively, to form first and second effective counters, respectively, each of count range $N/2$, a reference counter means for establishing a reference point, said reference counter means being operative to be stepped by stepping pulses derived from said clock pulse source, cyclically through a count range of $N/2$, means for providing unequal numbers of stepping pulses to said first and second effective counters to produce said count difference $n$ where the difference in said numbers equals 1 for each of said input pulses, means for logically combining signals from both said first and second counter means so as to generate first and second output signals each including an analog component, at said fundamental frequency, F, proportional to a trigonometric function of an angle $\theta$ where $\theta$ equals $(n/N)360°$ and where said first and second output signals are changed in width by said asymmetry control means, said change in width being produced alternately at opposite ends thereof about said reference point.

7. The apparatus of claim 6 further including a binary state directional store for storing a direction signal which indicates the positive or negative count direction for each of said input pulses and wherein said asymmetry control means includes alternating means, said alternating means being changed in state, in the absence of a change in said direction signal, for each of said input pulses, means for detecting a change in state of said direction signal for two successive input pulses, said means for detecting being operative, when energized, to inhibit the change in state of said alternating means on the second of said two successive input pulses.

8. The apparatus of claim 7 wherein for said direction signal at a first state, said first and second effective counters are stepped with 0 and 1 pulse, respectively, by said asymmetry control means and with 1 and 2 pulses, respectively, by said asymmetry control means with alternate input pulses.

9. The apparatus of claim 8 wherein for said direction signal at a second state, said first and second effective counters are stepped with 1 and 0 pulse, respectively, and with 2 and 1 pulses, respectively, with alternate input pulses.

10. The apparatus of claim 8 wherein a change in state of said direction signal causes said counter when counting in the 0 and 1 mode or in the 1 and 0 mode to count for the next input pulse in the 2 and 1 or 1 and 2 mode, respectively, or when counting in the 1 and 2 or 2 and 1 mode to count for the next input pulse in the 1 and 0 or 0 and 1 mode, respectively.

* * * * *